United States Patent
Tava et al.

(10) Patent No.: US 7,840,349 B2
(45) Date of Patent: Nov. 23, 2010

(54) NAVIGATION SYSTEM AND METHOD

(75) Inventors: Marcello Tava, Munich (DE); Wilfried Steins, Ismaning (DE); Bernd Biechele, Munich (DE); Uwe Koch, Vaterstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/390,823

(22) Filed: Feb. 23, 2009

(65) Prior Publication Data

US 2009/0265102 A1 Oct. 22, 2009

Related U.S. Application Data

(63) Continuation of application No. PCT/EP2007/006835, filed on Aug. 2, 2007.

(30) Foreign Application Priority Data

Aug. 24, 2006 (DE) ...................... 10 2006 039 634

(51) Int. Cl.
*G01C 21/00* (2006.01)
*G06F 19/00* (2006.01)
(52) U.S. Cl. .................. 701/211; 701/210; 340/995.14
(58) Field of Classification Search ................ 701/200, 701/211, 210; 340/995.14
See application file for complete search history.

(56) References Cited

U.S. PATENT DOCUMENTS

| | | | |
|---|---|---|---|
| 6,269,304 B1 | 7/2001 | Kaji et al. | |
| 6,269,305 B1 * | 7/2001 | Yamashita et al. | 701/211 |
| 6,446,000 B2 | 9/2002 | Shimabara | |
| 2001/0027377 A1 | 10/2001 | Shimabara | |
| 2003/0074131 A1 * | 4/2003 | Barkowski et al. | 701/200 |
| 2005/0149262 A1 | 7/2005 | Oikubo | |
| 2008/0036626 A1 * | 2/2008 | Kim | 340/995.14 |
| 2009/0326814 A1 * | 12/2009 | Harumoto et al. | 701/210 |

FOREIGN PATENT DOCUMENTS

| | | |
|---|---|---|
| DE | 100 09 850 A1 | 10/2000 |
| EP | 1 008 834 A1 | 6/2000 |
| EP | 1 085 299 A2 | 3/2001 |
| EP | 1 146 315 A2 | 10/2001 |
| EP | 1 241 445 A2 | 9/2002 |

OTHER PUBLICATIONS

International Search Report dated Nov. 30, 2007 with English translation (six (6) pages).
German Search Report dated May 30, 2007 with partial English translation (nine (9) pages).

* cited by examiner

*Primary Examiner*—Tan Q Nguyen
(74) *Attorney, Agent, or Firm*—Crowell & Moring LLP

(57) ABSTRACT

A navigation system has a display device for displaying a predefined maximal number of graphic driving lane objects. A control device is operatively configured such that the actual number of driving lanes of a street or road is determined, and only a maximal number of graphic driving lane objects is displayed on the display device when the maximal number is smaller than the actual number of driving lanes.

18 Claims, 4 Drawing Sheets

NAVIGATION SYSTEM AND METHOD

CROSS-REFERENCE TO RELATED APPLICATIONS

This application is a continuation of PCT International Application No. PCT/EP2007/006835, filed Aug. 2, 2007, which claims priority under 35 U.S.C. §119 to German Patent Application No. DE 10 2006 039 634.0, filed Aug. 24, 2006, the entire disclosures of which are herein expressly incorporated by reference.

BACKGROUND AND SUMMARY OF THE INVENTION

The invention relates to a navigation system and method having a display device for displaying a maximal number of driving lanes.

In recent years, vehicle navigation systems have established themselves by which a driver is guided in a satellite-supported manner on a route determined by the navigation system from a starting location to a place of destination. In this case, the routing is based on the display of streets or roads and direction arrows. In the case of future navigation systems, the routing is to take place even on the basis of driving lanes of a street or road. Here, it will be problematic to display the thereby increased amount of information, particularly on roads with many driving lanes, in such a manner that the information can rapidly and intuitively be detected by the driver on the relative small display devices of the vehicle navigation systems whose display capacity is physically limited or limited with respect to programs.

It is therefore an object of the invention to indicate a lane-based navigation system and method which can also be used together with a display device of a predefined type on roads or streets with many driving lanes.

The invention is therefore based on the idea that, on a display device of a navigation system that is designed only for a display of a predefined maximal number of graphic driving lane objects, this maximal number of graphic driving lane objects will only be displayed when the actual number of driving lanes of the momentarily traveled street or road is greater than the maximal number of displayable graphic driving lane objects. In this case, a graphic driving lane object includes, for example, a stylized driving lane display.

For this purpose, a navigation system and method preferably has a display device particularly for the stylized display of a predefined maximal number of graphic driving lane objects and a control device which is arranged such that the actual number of driving lanes of a street or road is determined, and that a maximal number of graphic driving lane objects is displayed on the display device only when the maximal number is smaller than the actual number. The remaining driving lanes are not shown.

According to the invention, it is first achieved that an economically producible navigation system can be used in a faultless manner also when the number of driving lanes of a street or road is greater than the maximal number of driving lanes or graphic driving lane objects that can be displayed by the display device of the navigation system.

A driving-lane-based routing can be detected particularly intuitively by the driver in that at least one graphic driving lane replacement object representing the not displayed (omitted) driving lanes, such as, for example, by the display of three points or stops ("ellipses"), when the maximal number is smaller than the actual number. The at least one graphic driving lane replacement object informs the driver of one or more not displayed (omitted) driving lanes.

The display can be detected even more intuitively when a display of the at least one graphic driving lane replacement object superimposed on the display of the maximal number of graphic driving lane replacement objects takes place such that the position of the display of the graphic driving lane replacement object corresponds to the position of the at least one driving lane that is not shown. The graphic driving lane replacement object therefore also informs the driver of the position of one or more not displayed driving lanes relative to the position of the driving lanes displayed by way of the graphic driving lane objects.

The graphic driving lane replacement object, which symbolizes a further expansion of the street or road in the lateral direction, is preferably displayed on the half or the quarter of the display device on which the incomplete or omitted portion of the street or road would have been displayed.

Particularly preferably, the graphic driving lane replacement object is displayed in a manner superimposed on the graphic driving lane object or the graphic driving lane objects which, although they do not represent the outermost driving lane of the street or road, are displayed on the outside on the display device because of the limited size of the display device.

As an alternative to the superimposed display, the display of the graphic driving lane replacement object takes place adjacent to the display of the maximal number of graphic driving lane objects, the position of the display of the graphic driving lane replacement object, particularly as described above, corresponding to the position of the not displayed driving lanes.

As an alternative, the display of the graphic driving lane replacement object takes place instead of the display of one graphic driving lane object or the graphic driving lane objects situated on the extreme outside, the position of the display of the graphic driving lane replacement object, particularly as described above, corresponding to the position of the not displayed driving lanes. Therefore, when the actual number is greater than the maximal number, only a maximal number of graphic driving lane objects is displayed that is reduced by one or two, and, in addition, one or two graphic driving lane replacement objects are displayed.

In addition or as an alternative, the intuitive, reliable and rapid detectability of the displayed driving-lane-based routing is increased in that two graphic street or road boundary objects are displayed on the display device when the maximal number is at least as large as the actual number; in that only one or no graphic street or road boundary object is displayed when the maximal number is smaller than the actual number; and in that the display of a graphic street or road boundary object, particularly with respect to the display of the graphic driving lane replacement object, takes place along the display of a graphic driving lane object representing the outermost driving lane of the street or road.

Preferably, the driving lanes are displayed by use of graphic driving lane objects which are suitable, determined or provided for following the route determined by the navigation system when the maximal number is smaller than the actual number. Thus, when the number of actual driving lanes exceeds the number of driving lanes that can be maximally displayed on the display device by means of graphic driving lane objects, the driving lanes which are (particularly) suitable for following the route determined by the navigation system are selected for the display by use of the graphic driving lane objects. When a street or road has, for example, six driving lanes but only four of those driving lanes can be displayed by graphic driving lane objects on the display device, at least the driving lane or at least the two, three or four driving lanes are displayed by graphic driving lane objects which are particularly suitable for following the route determined by the navigation system. The driving lanes which are not suitable for following the route determined by the navigation system are not displayed or preferably not displayed. As a result, the amount of displayed information is particularly reduced to essential information, so that a driver still has an overall picture even in complex traffic and road situations.

Particularly preferably, it is provided that the driving lanes are displayed by graphic driving lane objects which, in the next turn-off situation (intersection, street or road entrance, highway entrance ramp, highway exit ramp, street crossing, pedestrian crossing, etc.), are suitable for following the route determined by the navigation system. Particularly those driving lanes are displayed by graphic driving lane objects that can be retained in the next turn-off situation for reaching the destination. As a result, the driver is guided in a simple and rapidly detectable manner early onto the correct driving lane.

In addition, it is preferably provided that the driving lanes are displayed by graphic driving lane objects which, in the next but one turn-off situation, are suitable for following the route determined by the navigation system. Particularly those driving lanes are displayed by graphic driving lane objects which can be retained at the next but one turn-off situation for reaching the destination. As a result, the driver is guided still earlier onto the correct driving lane.

A particularly preferred further development of the invention provides that, superimposed on the display of driving lanes that are suitable for following the route determined by the navigation system, one graphic driving direction object respectively is displayed, such as a directional arrow or a turn-off arrow, which describes the route determined by the navigation system, particularly in the next turn-off situation.

In particular, one graphic driving direction object respectively is displayed in a manner superimposed on the graphic driving lane objects that can be retained in the next and/or the next but one turn-off situation, in order to reach the destination.

The invention naturally also includes navigation systems where the invention or its further developments are not implemented in each driving situation, particularly where the displays according to the invention appear only in certain driving situations or road or street situations.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
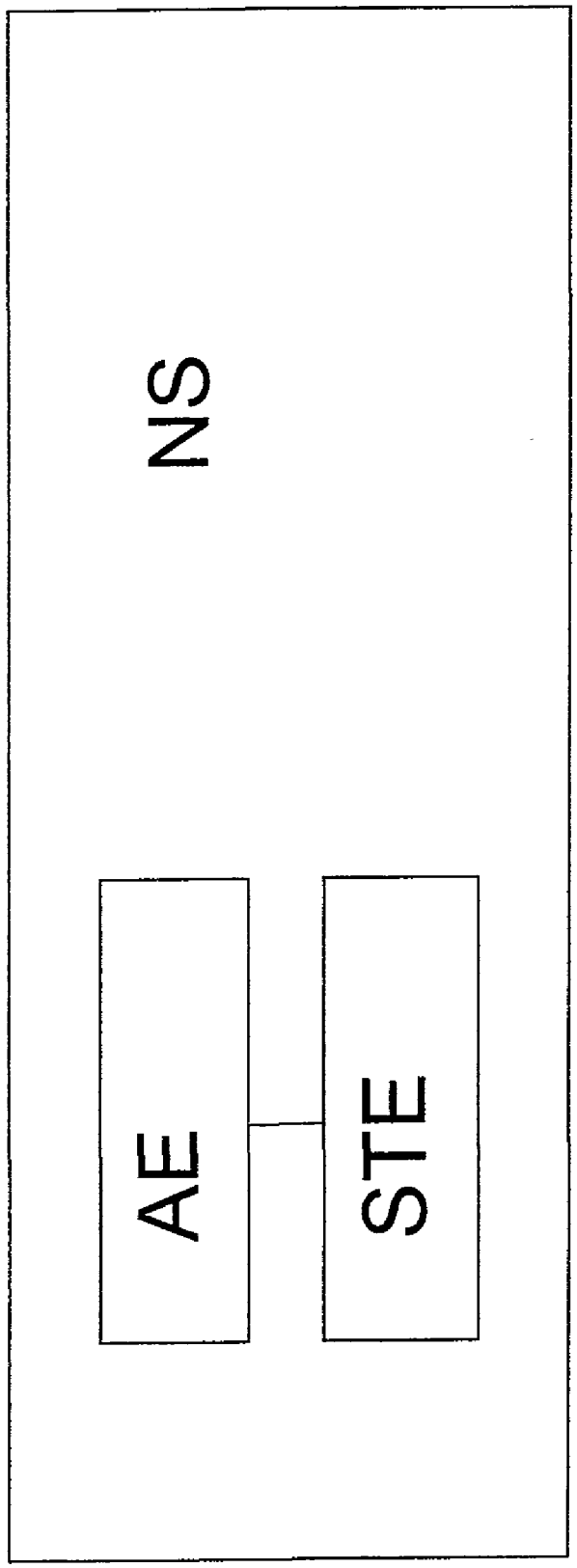
FIG. 1 is a schematic block diagram of a navigation system.

FIG. 1 illustrates a navigation system NS installed in a vehicle (not shown), having a display device AE, such as a graphic display, and a control device STE which controls the navigation system NS and the display device AE.

The control device STE may be implemented as a program-controlled processor device or as an application-specific integrated circuit and is arranged for carrying out the display variants indicated below.

Furthermore, the navigation system NS has the conventional components of navigation systems, such as a memory device used for the storage of an electronic road map. The actual position of the vehicle within the road network, the driving lane momentarily traveled by the vehicle, the number of driving lanes of the momentarily traveled road or street and/or the virtual or actual road or street markings are determined by way of the memory device, a location determination device and/or a sensor device, such as a camera.

FIG. 2*a* is a schematic view of road or street markings 21, shown as an example, of a road or street having four driving lanes with corresponding turn-off arrows or driving direction arrows of the type known per se. As illustrated in FIG. 2*a*, the actual number of driving lanes of the road or street is four (4). It is assumed here that this particular road or street is the road or street presently being traveled upon, or soon to be traveled upon, by the vehicle having the navigation system. In this case, the invention can be used irrespective of whether the actually traveled road or street is in fact provided with turn-off arrows or driving direction arrows, or whether the corresponding turn-off arrows or driving direction arrows are assigned to the various driving lanes in a different manner (virtually marked). This assignment is either read out of a memory device of the navigation system or is detected by way of suitable sensors.

Figure 2:
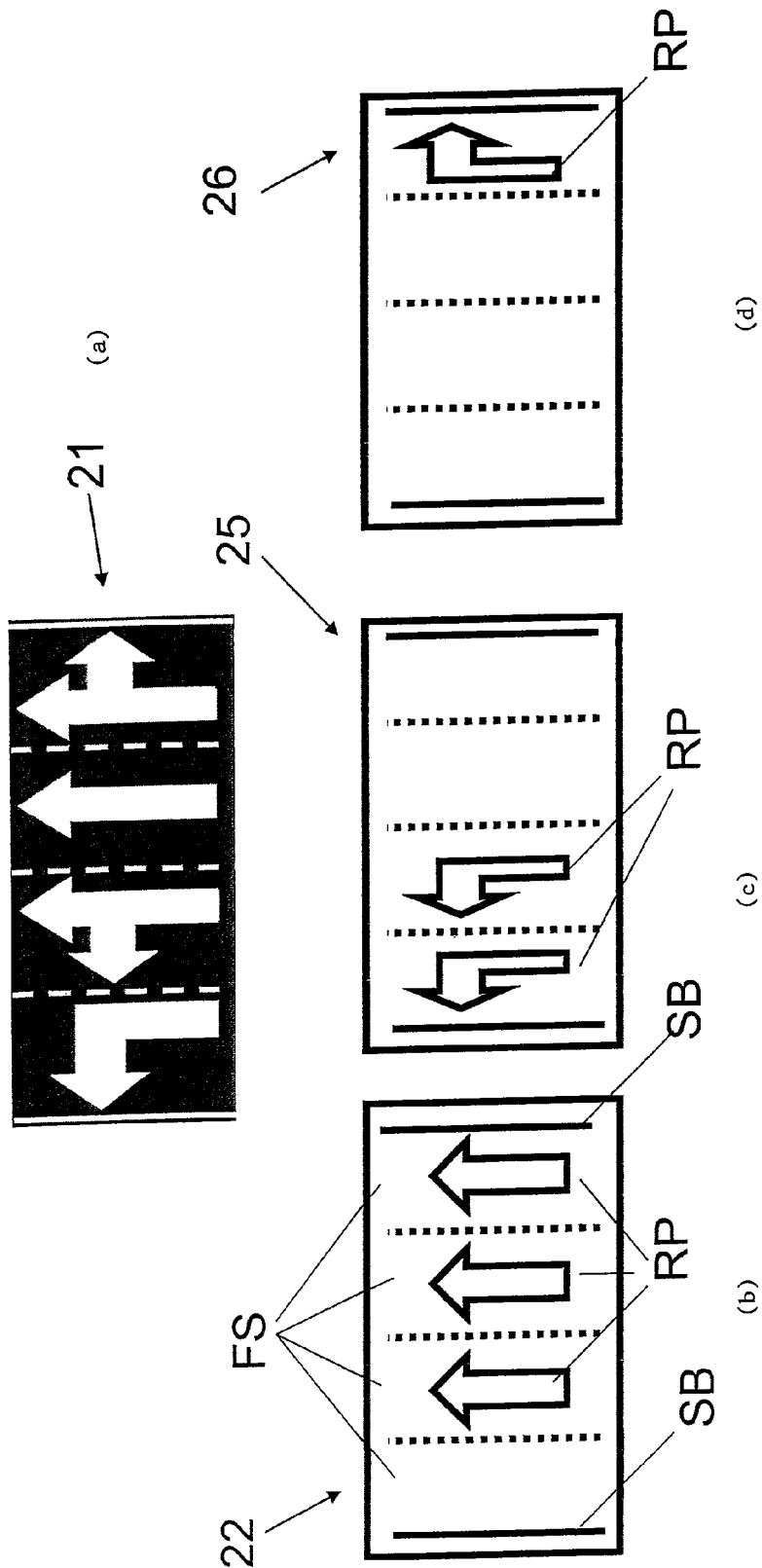
FIG. 2(*a*)-(*d*), FIG. 3(*a*)-(*e*) and FIG. 4(*a*)-(*f*) are views of road or street markings and pertaining views of driving lanes illustrating the invention.

In this example, the display device is arranged for displaying maximally four (maximal number) driving lanes in each case by way of a graphic driving lane object FS (see FIGS. 2(*b*)-(*d*)).

Graphic street or road boundary objects SB are in each case displayed as a solid line along the display of the two outer graphic driving lane objects FS. The display of the graphic driving lane objects FS may include graphic road boundary objects SB and/or the dotted separating lines, but may also only include the display of corresponding surfaces in-between.

Now, the driver is to be guided to his destination, in each case, on the basis of the respectively set up route or routing, particularly according to the actual vehicle position and place of destination, by use of a corresponding display on the display device of a navigation system and based on the actual or virtual street or road markings. For this purpose, the driver's attention is drawn or the driver is guided to suitable driving lanes—for following the selected route. This takes place by the display of corresponding graphic driving direction objects RP, which are displayed in a manner superimposed on the corresponding displays of the suitable driving lanes by way of graphic driving lane objects FS.

Three different displays 22,25,26 are shown in FIGS. 2(*b*)-(*d*) for the display device, which differ from one another depending on the respectively set-up routing, particularly in the next turn-off situation.

In the case of the first display 22 (FIG. 2*b*), it is assumed that, according to the routing, the vehicle is to drive straight ahead in the next turn-off situation. As shown by the display of the street or road markings 21, only the three right-hand driving lanes are suitable for this purpose, whose corresponding graphic driving lane objects FS are therefore marked or superimposed by a "straight-ahead arrow" RP corresponding to the route in the display.

In the case of the second display 25 (FIG. 2*c*), it is assumed that, according to the routing, the vehicle is to turn off to the left in the next turn-off situation. As shown by the display of the street or road markings 21, only the two left-hand driving lanes are suitable for this purpose, whose corresponding graphic driving lane objects FS are therefore each marked by a "left turn-off arrow" RP corresponding to the route in the display.

In the case of the third display 26 (FIG. 2d), it is assumed that, according to the routing, the vehicle is to turn off to the right in the next turn-off situation. As shown by the display of the street or road markings 21, only the right-hand driving lane is suitable for this purpose, which is therefore marked by a "right turn-off arrow" RP corresponding to the route in the display.

Figure 3:
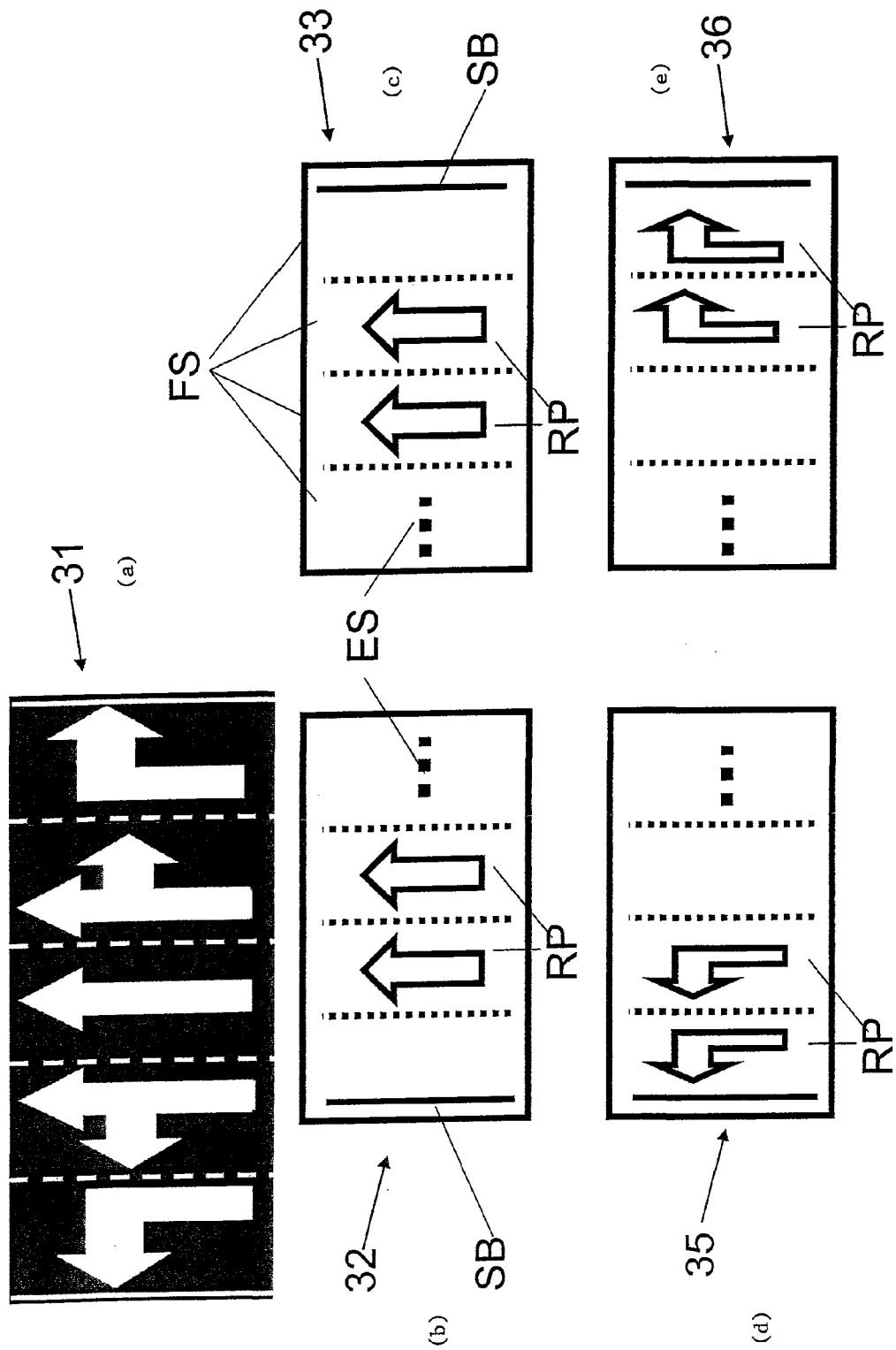

FIG. 3a is a schematic view of road or street markings 31, shown as an example, of a road or street with five driving lanes with corresponding turn-off arrows of the type known per se. The actual number of driving lanes is therefore five. However, the display device is again only set up for displaying maximally four (maximal number) graphic driving lane objects FS (see FIGS. 3(b)-(e)). The actual number is therefore larger than the maximal number, which is why all driving lanes can no longer be illustrated in the same manner.

Now, the driver again is to be guided to his destination, in each case, according to the route or routing, by use of a corresponding display on the display device based on the actual or virtual street or road markings. For this purpose, his attention is again drawn or guided to driving lanes—suitable for following the selected route—by the display of corresponding graphic driving direction objects RP.

Four different displays 32, 33, 35, 36 (see FIGS. 3(b)-(e)) are now shown which, in each case, according to the routing on which they are based, differ from one another, particularly in the next and/or next but one turn-off situation.

In the case of the first two displays 32 and 33, it is assumed that, according to the routing, the vehicle is to drive straight ahead in the next turn-off situation.

As indicated in the display of the road or street marking 31, only the three center driving lanes are suitable for this purpose, two of which therefore are marked by a "straight-ahead arrow" RP in the display corresponding to the route. In addition, a graphic driving lane replacement object ES is displayed on the, or instead of, the graphic driving lane object which, although it is displayed or would have to be displayed on the extreme outside on the display device, does not represent the outer driving lane of the road or street, which graphic driving lane replacement object ES points to the driving lane of the road or street which is not shown and is on the extreme right (display 32) or on the extreme left (display 33). In addition, a graphic road or street boundary object SB is displayed along the graphic driving lane object displayed on the outside.

As an alternative, within the scope of the invention, the graphic road or street boundary object SB is not to be displayed, and/or the graphic driving lane replacement object ES is not to be displayed, and/or the display of a direction arrow, here, of a "straight-ahead arrow", is to be superimposed on the driving lane display on which the graphic driving lane replacement object ES is superimposed, because, corresponding to the road or street markings, this driving lane is also suitable for following the route.

Particularly preferably, it is provided that, from the two conceivable displays 32 and 33, the more suitable display is to be selected and indicated while taking into account the next but one turn-off situation.

If a turning-off to the left is required in the next but one turn-off situation, display 32 is selected; if, in contrast, a turning-off to the right is required in the next but one turn-off situation, display 33 is selected. The reason is that the display selected in this manner shows the driving lanes that are suitable for the next turn-off situation and are more suitable for the next but one turn-off situation than others suitable in the next turn-off situation.

In the case of the third display 35 (FIG. 3(d)), it is assumed that, according to the routing, the vehicle is to turn off to the left in the next turn-off situation. As shown by the display of the street or road markings, only the two left-hand driving lanes are suitable for this purpose, which are therefore each marked by a "left turn-off arrow" RP corresponding to the route in the display.

In the case of the fourth display 36 (FIG. 3(e)), it is assumed that, according to the routing, the vehicle is to turn off to the right in the next turn-off situation. As shown by the display of the street or road markings, only the two right-hand driving lanes are suitable for this purpose, which are therefore marked by a "right turn-off arrow" RP corresponding to the route in the display.

Figure 4:
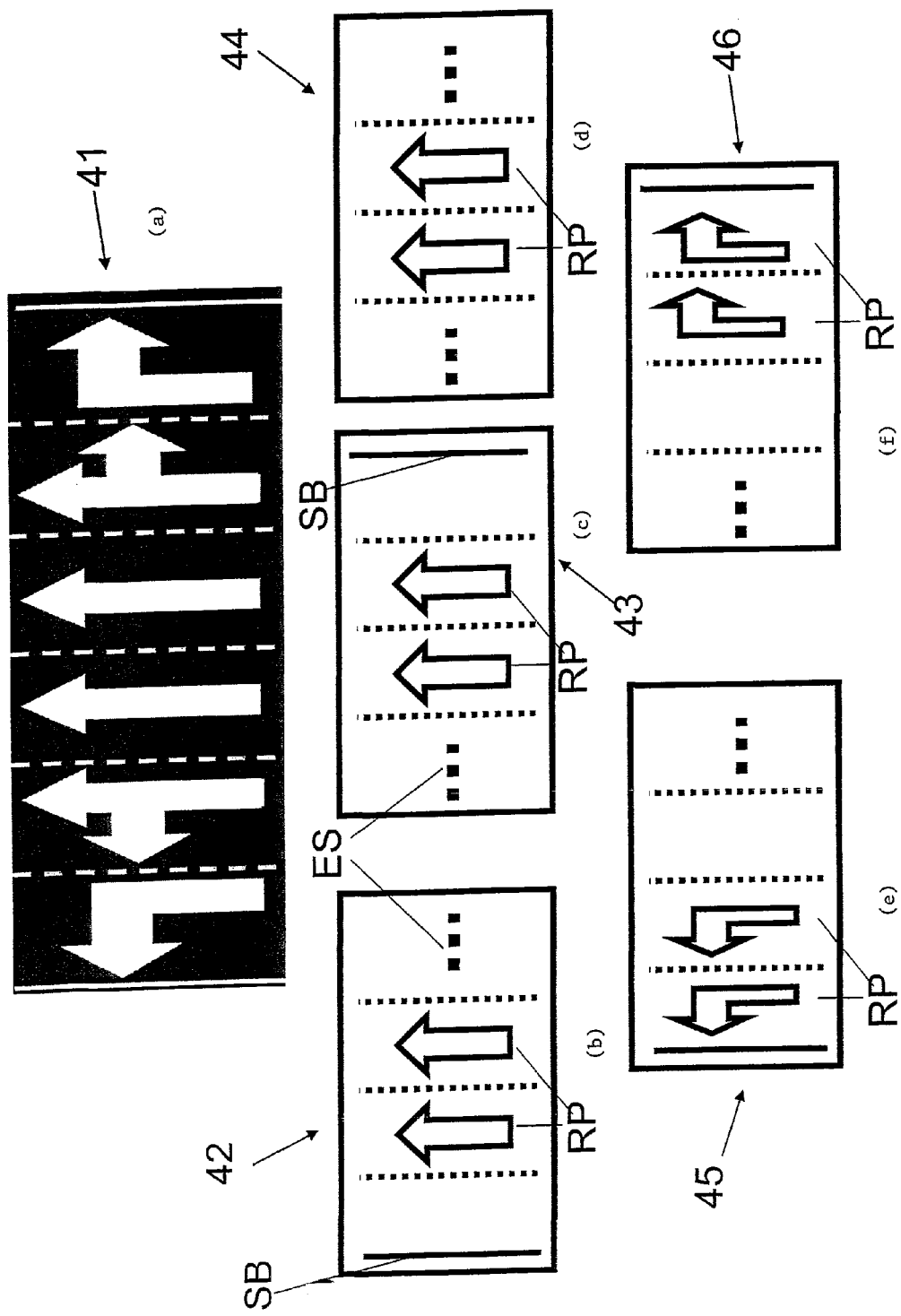

FIG. 4a is a schematic view of road or street markings 41, shown as an example, of a road or street having six driving lanes with corresponding turn-off arrows of the type known per se. The actual number of driving lanes is therefore six. However, the display device is again only set up for displaying maximally four (maximal number) graphic driving lane objects FS. Again, not all driving lanes can be illustrated in the same manner.

Now, the driver again is to be guided to his destination, in each case, according to the route or routing, by way of a corresponding display on the display device based on the actual or virtual street or road markings.

Five different displays 42, 43, 44, 45, 46 (FIGS. 4(b)-(f)) are now shown which, in each case, according to the routing on which they are based, differ from one another, particularly in the next and/or next but one turn-off situation.

In the case of the first three displays 42, 43 and 44, it is assumed that the vehicle is to drive straight ahead in the next turn-off situation according to the routing.

As indicated in the display of the road or street marking 41, only the four center driving lanes are suitable for this purpose, two of which therefore are marked by a "straight-ahead arrow" RP in the display corresponding to the route. In addition, one graphic driving lane replacement object ES respectively is displayed on the driving lanes which, although they are displayed on the extreme outside on the display device, do not form the outer driving lane of the road or street. The graphic driving lane replacement objects ES point to the driving lanes of the road or street which are not shown and are on the right (display 42) or on the left (display 43) or on the outside (display 44). In addition, a graphic road or street boundary object SB is displayed along the driving lane (graphic driving lane object) displayed on the outside, which, in addition, forms the outer driving lane of the road or street.

As an alternative, within the scope of the invention, the graphic road or street boundary object SB is not to be displayed, and/or the graphic driving lane replacement object ES is not to be displayed, and/or the display of a direction arrow, here, of a "straight-ahead arrow", is to be superimposed on the driving lane display on which the graphic driving lane replacement object ES is superimposed, because, corresponding to the road or street markings, this driving lane is also suitable for following the route.

Particularly preferably, it is provided that, from the three conceivable displays 42, 43 and 44, the more suitable display is to be selected and indicated while taking into account the next but one turn-off situation.

If a turning-off to the left is required in the next but one turn-off situation, display 42 is selected; if, in contrast, a turning-off to the right is required in the next but one turn-off situation, display 43 is selected. If, in contrast, in the next but one turn-off situation, a straight-ahead driving is required, display 44 is selected. The reason is that the display selected in this manner shows the driving lanes that are suitable for the next turn-off situation and are more suitable for the next but one turn-off situation than others.

In the case of the fourth display 45 (FIG. 4(e)), it is assumed that, according to the routing, the vehicle is to turn off to the left in the next turn-off situation. As shown by the display of the street or road markings, only the two left-hand driving lanes are suitable for this purpose, which are therefore each marked by a "left turn-off arrow" RP corresponding to the route in the display.

In the case of the fifth display 46 (FIG. 4(f)), it is assumed that, according to the routing, the vehicle is to turn off to the right in the next turn-off situation. As shown by the display of the street or road markings, only the two right-hand driving lanes are suitable for this purpose, which are therefore marked by a "right turn-off arrow" RP corresponding to the route in the display.

In the following, an embodiment of the invention will be described in a formal manner. In this case, it is assumed that the graphic driving lane replacement object ES is not displayed while being superimposed on a displayed graphic driving lane object, but rather is displayed instead of a graphic driving lane object. The maximal number of displayable graphic driving lane objects and/or graphic driving lane replacement objects "n" in this embodiment is therefore 4. The actual number N of driving lanes is 6. When, as in this example, the actual number N is larger than the maximal number n, only (n−1)=3 graphic driving lane objects and one graphic driving lane replacement object can be displayed, or (n−2)=2 graphic driving lane objects and two graphic driving lane replacement objects can be displayed.

The following graphic elements are used for the display:

(a) Graphic Road or Street Boundary Object: For example, a continuous line may show either the physical edge of the road or street or a traffic line which separates the momentary road or street from an adjacent road or street that can be traveled in an opposite direction, or onto which a change cannot take place for other reasons.

(b) Graphic Driving Lane Boundary Object: For example, a dotted or broken line may divide the road or street into driving lanes to which different traffic rules may apply.

(c) Graphic Driving Lane Information Objects (graphic driving direction objects): For example, direction arrows between two graphic driving lane boundary objects or between one graphic driving lane boundary object and one graphic road or street boundary object may point to recommended or suitable driving lanes from which the next maneuver or turning-off can be carried out.

(d) Graphic Driving Lane Replacement Object: For example, three points may provide the information that one or more driving lanes are not displayed (omitted). The graphic driving lane replacement object can also be supplemented or replaced by a number which indicates the number of not displayed driving lanes.

The driving lanes will now be represented by a sequential integral number i, so that i increases from 1 to N and thereby represents the driving lanes from the left to the right. For example, the third driving lane from the left is i=3.

The set of all driving lanes will be called $L_i\{1, \ldots N\}$, wherein the index i indicates that the identification of the elements of $L_i$ is based on the i-numeration rule.

The set of the recommended or suitable driving lanes will be called $R_i \subseteq L_i$.

The range $w_R$ of the essential driving lane information will be defined as: $w_R = \max(R_i) - \min(R_i) + 1 + \min[\min(R_i)-1, N-\max(R_i)]$.

The set of central driving lanes $C_i \subseteq R_i$ will be defined as the set of driving lanes from $R_i$ which meets the following condition:

$$\left|\frac{N+1}{2} - i\right| = \max_{i \in R_1}\left(\left|\frac{N+1}{2} - i\right|\right)$$

The set of outer driving lanes $S_i \subseteq R_i$ will be defined as the set of driving lanes from $R_i$ which meets the following condition: $\min(i, N-i+1) < n$.

The following rules apply:

Case 1: $n > w_R$.

It is assumed that $i_c = \max(C_i)$. When $i_c < (N+1)/2$, it is assumed that $i=1, \ldots n-1$ represents the driving lanes and represents a graphic driving lane replacement object ES on the right. When $i_c \geq (N+1)/2$, it is assumed that $i=N-n+2 \ldots N$ represents the driving lanes and a graphic driving lane replacement object ES on the left.

Case 2: $n \leq w_R$.

Case 2.1: When $\exists i \in S_i$, so that $i<n$ and when $\exists i \in S_i$, so that $N-i+1<n$. When the next but one maneuver is a left turning-off, it is assumed that $i=1, \ldots n-1$ represents the driving lanes, and represents a graphic driving lane replacement object on the right. When the next but one maneuver is a right turning-off, it is assumed that $i=N-n+2, \ldots N$, represents the driving lanes and represents a graphic driving lane replacement object on the left. When the next but one maneuver is a straight-ahead drive, it is assumed that the values i are found which minimize the $\min(i-1, N-i)$ and $i_s$ equated with the maximum of these values. When now $i_s<(N+1)/2$, then it is assumed that $i=1, \ldots n-1$ represents the driving lanes and a graphic driving lane replacement object on the right. When $i_s \geq (N+1)/2$, then it is assumed that $i=N-n+2, \ldots N$ represents the driving lanes and a graphic driving lane replacement object on the left.

Case 2.2: When $\exists i \in S_i$, so that $i<n$ and when $\sim\exists i \in S_i$ so that $N-i+1<n$, it is assumed that $i=1, \ldots n-1$ represents the driving lanes and a graphic driving lane replacement object on the right. When $\sim\exists i \in S_i$, so that $i<n$ and when $\exists i \in S_i$ so that $N-i+1<n$, it is assumed that d $i=N-n+2, \ldots N$ represents the driving lanes and a graphic driving lane replacement object on the left.

Case 2.3: When $S_i = \emptyset$, it is assumed that $i_c \in C_i$ is selected and $i=i_c$, $i_c+1$ represents the driving lanes and a graphic driving lane replacement object on the right and a graphic driving lane replacement object on the left.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A navigation system, comprising:
    a display device for displaying a predefined maximal number of graphic driving lane objects;
    a control device operatively configured to determine an actual number of driving lanes of a road, wherein the control device causes the display device to display only the maximal number of graphic driving lane objects if the maximal number is less than the actual number of driving lanes of the road.

2. The navigation system according to claim 1, wherein a graphic driving lane replacement object is displayed on the display device when the maximal number is less than the actual number.

3. The navigation system according to claim 2, wherein the graphic driving lane replacement object is superimposed on a display of the displayed maximal number of graphic driving lane objects; and
   wherein the position of the display of the graphic driving lane replacement object corresponds to a position of an omitted actual driving lane of the road.

4. The navigation system according to claim 3, wherein two graphic road boundary objects are displayed on the display device when the maximal number is at least equal to the actual number;
   wherein no more than one graphic road boundary object is displayed when the maximal number is less than the actual number; and
   wherein a displayed graphic road boundary object is positioned along the display of the graphic driving lane object representing an outermost driving lane of the road.

5. The navigation system according to claim 2, wherein the display of the graphic driving lane replacement object takes place adjacent to a display of the maximal number of graphic driving lane objects; and
   wherein the position of the display of the graphic driving lane replacement object corresponds to a position of one or more omitted actual driving lanes of the road.

6. The navigation system according to claim 5, wherein two graphic road boundary objects are displayed on the display device when the maximal number is at least equal to the actual number;
   wherein no more than one graphic road boundary object is displayed when the maximal number is less than the actual number; and
   wherein a displayed graphic road boundary object is positioned along the display of the graphic driving lane object representing an outermost driving lane of the road.

7. The navigation system according to claim 2, wherein two graphic road boundary objects are displayed on the display device when the maximal number is at least equal to the actual number;
   wherein no more than one graphic road boundary object is displayed when the maximal number is less than the actual number; and
   wherein a displayed graphic road boundary object is positioned along the display of the graphic driving lane object representing an outermost driving lane of the road.

8. The navigation system according to claim 1, wherein two graphic road boundary objects are displayed on the display device when the maximal number is at least equal to the actual number;
   wherein no more than one graphic road boundary object is displayed when the maximal number is less than the actual number; and
   wherein a displayed graphic road boundary object is positioned along the display of the graphic driving lane object representing an outermost driving lane of the road.

9. The navigation system according to claim 1, wherein, when the maximal number is less than the actual number, driving lanes of the road are displayed as graphic driving lane objects that are particularly suitable for following a route determined by the navigation system.

10. The navigation system according to claim 9, wherein the driving lanes of the road displayed as graphic driving lane objects those are particularly suitable in a next turn-off situation for following the route determined by the navigation system.

11. The navigation system according to claim 10, wherein the driving lanes of the road displayed as graphic driving lane objects are those particularly suitable in a next but one turn-off situation for following the route determined by the navigation system.

12. The navigation system according to claim 9, wherein, superimposed on the display of graphic driving lane objects representing driving lanes particularly suitable for following the route determined by the navigation system, one graphic driving direction object, respectively, is displayed describing the route in a next turn-off situation.

13. A method of providing driving lane information to a user of a navigation system, the method comprising the acts of:
   determining an actual number of lanes of a road;
   displaying on a display device for the user only a predefined maximal number of graphic driving lane objects if the maximal number is lower than the determined actual number of the lanes of the road.

14. The method according to claim 13, further comprising the act of displaying on the display device a graphic driving lane replacement object when the maximal number is lower than the actual number.

15. The method according to claim 14, further comprising the acts of:
   superimposing the displayed graphic driving lane replacement object on the displayed maximal number of graphic driving lane objects in a position on the display corresponding to a position of a not displayed driving lane of the road.

16. The method according to claim 15, further comprising the acts of:
   when the maximal number is at least equal to the actual number, displaying two graphic road boundary objects;
   when the maximal number is less than the actual number, displaying no more than one graphic road boundary object; and
   wherein any displayed graphic road boundary object takes place along a display of the graphic driving lane object representing an outermost driving lane of the road.

17. The method according to claim 14, further comprising the acts of:
   displaying the graphic driving lane replacement object in a position adjacent to the displayed maximal number of graphic driving lane objects corresponding to a position of a not displayed driving lane of the road.

18. The method according to claim 17, further comprising the acts of:
   when the maximal number is at least equal to the actual number, displaying two graphic road boundary objects;
   when the maximal number is less than the actual number, displaying no more than one graphic road boundary object; and
   wherein any displayed graphic road boundary object takes place along a display of the graphic driving lane object representing an outermost driving lane of the road.

* * * * *